United States Patent
Horii

(10) Patent No.: US 7,234,551 B2
(45) Date of Patent: *Jun. 26, 2007

(54) FUEL CELL VEHICLE

(75) Inventor: Yoshiyuki Horii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 10/886,677

(22) Filed: Jul. 9, 2004

(65) Prior Publication Data

US 2005/0051370 A1 Mar. 10, 2005

(30) Foreign Application Priority Data

Jul. 11, 2003 (JP) .............................. 2003-195927

(51) Int. Cl.
*B60K 1/04* (2006.01)

(52) U.S. Cl. ...................................... 180/65.1; 180/220
(58) Field of Classification Search ............... 180/65.1, 180/220, 225, 68.5
See application file for complete search history.

(56) References Cited

U.S. PATENT DOCUMENTS

| | | | | |
|---|---|---|---|---|
| 5,207,288 A | * | 5/1993 | Ono ........................... | 180/220 |
| 5,577,747 A | * | 11/1996 | Ogawa et al. ............... | 180/220 |
| 5,647,450 A | * | 7/1997 | Ogawa et al. ............... | 180/220 |
| 6,155,369 A | * | 12/2000 | Whittaker ................... | 180/220 |
| 6,568,496 B1 | * | 5/2003 | Huang ......................... | 180/220 |
| 6,679,345 B2 | * | 1/2004 | Hirayama et al. .......... | 180/65.3 |
| 6,691,813 B2 | * | 2/2004 | Schless ....................... | 180/220 |
| 6,715,571 B2 | * | 4/2004 | Nakamori .................... | 180/65.1 |
| 6,722,460 B2 | * | 4/2004 | Yang et al. .................. | 180/220 |
| 7,108,027 B2 | * | 9/2006 | Horii ....................... | 141/311 A |
| 2001/0000394 A1 | * | 4/2001 | Whittaker ................... | 180/220 |
| 2002/0005305 A1 | * | 1/2002 | Hirayama et al. .......... | 180/68.5 |
| 2003/0094324 A1 | * | 5/2003 | Huang ......................... | 180/220 |
| 2004/0050606 A1 | * | 3/2004 | Yang et al. .................. | 180/220 |
| 2005/0092538 A1 | * | 5/2005 | Baldwin et al. ............ | 180/220 |
| 2005/0098373 A1 | * | 5/2005 | Horii ........................... | 180/291 |
| 2005/0133283 A1 | * | 6/2005 | Horii ........................... | 180/65.1 |
| 2005/0217910 A1 | * | 10/2005 | Yonehana et al. .......... | 180/68.5 |
| 2006/0060400 A1 | * | 3/2006 | Iwashita et al. ............ | 180/65.3 |
| 2006/0065461 A1 | * | 3/2006 | Makuta et al. .............. | 180/220 |

FOREIGN PATENT DOCUMENTS

JP 2001-351652 A 12/2001

* cited by examiner

*Primary Examiner*—Jeff Restifo
(74) *Attorney, Agent, or Firm*—Birch, Stewart, Kolasch & Birch, LLP

(57) ABSTRACT

To provide a fuel cell vehicle in which a fuel cylinder and a fuel cell stack are arranged so that the barycentric position is kept low and load is appropriately shared between the front and rear wheels. The fuel cylinder is mounted further forward than a seat, at a recumbent attitude inclined such that the shut-off valve side faces to the rear and the shut-off valve end is higher than the other end. The fuel cell box is positioned below the fuel cylinder between the pair of left and right lower frames and is fixed by being suspended from brackets provided at two places on the left and right upper frames, so as to overlap and run along a line connecting a rotational axis of the front wheel FW and the rotational axis of the rear wheel.

18 Claims, 12 Drawing Sheets

FUEL CELL VEHICLE

CROSS-REFERENCE TO RELATED APPLICATIONS

The present application claims priority under 35 USC 119 to Japanese Patent Application No. 2003-195927 filed on Jul. 11, 2003 the entire contents thereof is hereby incorporated by reference.

BACKGROUND OF THE INVENTION

1. Field of the Invention

The present invention relates to a fuel cell vehicle driven with a fuel cell as a drive energy source, and particularly to a fuel cell vehicle in which drivability is improved by arranging heavy components at appropriate positions.

2. Description of Background Art

A fuel cell type two-wheeled vehicle is known that is driven by supplying electrical power generated by a fuel cell to a motor with the rear wheels being driven by the motor. With a fuel cell system, electricity is generated by a chemical reaction between hydrogen, as a fuel gas, and oxygen, as a reactant gas. However, methods for supplying hydrogen are roughly divided into two types for a vehicle fuel cell.

One method utilizes methanol as a fuel and extracting hydrogen from the methanol using a reformer. In another method hydrogen gas is filled into the fuel cylinder in advance. Of these two methods, it is more common to adopt the latter system that does not require a large mass reformer as a fuel cell system for a motorcycle, which has restricted deadweight.

With the latter fuel cell system, a fuel cylinder filled with fuel gas and a fuel cell stack (or cell stack) for converting the fuel gas to electrical energy, constitute the main structure. Because the fuel cylinder and the fuel cell stack are heavy, the barycentric position is made higher due to the arrangement of these components.

Japanese Patent 2001-130469 and Japanese Patent 2001-313056 disclose two-wheeled vehicles powered by fuel cells wherein the fuel cell stack is arranged above a step floor below a seat, and a fuel cylinder is mounted above a rear wheel to the rear of the seat.

In both of the above disclosed Japanese Patents, there is a problem wherein as the fuel cell stack are arranged below a seat and the fuel cylinder is arranged behind the seat, drivability is impaired due to the fact that heavy components are arranged in a dispersed manner on the vehicle. Also, with both of the above-described Japanese Patents, since a fuel cylinder is supported above the rear wheel, there is a technical problem in that the barycentric position of the vehicle body becomes high.

SUMMARY AND OBJECTS OF THE INVENTION

The object of the present invention is to solve the above-described technical problems in the related art, and to provide a fuel cell two-wheeled vehicle in which a fuel cylinder and a fuel cell stack are arranged so that the barycentric position is kept low and the load is appropriately shared between the front and rear wheels.

In order to achieve the above described object, the present invention is directed to a fuel cell vehicle provided with a fuel cylinder and a fuel cell stack that is driven by electrical power obtained by causing an electrochemical reaction between fuel gas and reactant gas wherein a containing support member is provided for supporting both the fuel cylinder and the fuel cell stack so that the fuel cylinder is positioned almost directly above the fuel cell stack. A seating section is provided further to the rear of the vehicle than the position where the fuel cylinder and the fuel cell stack are supported.

The containing support member serves as a vehicle frame with the fuel cell stack being arranged at the lowest position of the vehicle frame along a lower frame that is provided to extend in a longitudinal direction of the vehicle.

The fuel cell stack is arranged along a straight line connecting a rotational axis of a front wheel and a rotational axis of a rear wheel. The fuel cell stack overlaps this line.

The fuel cylinder is supported in a longitudinal direction of the vehicle and at an inclined attitude of a specified angle.

The fuel cylinder is supported at an inclined attitude with a shut-off valve end of the fuel cylinder to the rear and that rear end being higher than the other end.

According to the above description, since the heavy fuel cylinder and fuel cell stack are arranged to be concentrated in a single place the drivability is improved by centralizing the mass. Also, since the fuel cylinder and the fuel cell stack are arranged to be further forward than the seating position, it is possible to arrange the fuel cylinder and the fuel cell stack close to each other, with the result that it is possible to shorten the length of a fuel gas supply passage.

According to the present invention, since the fuel stack is arranged at a position lower than the step floor, it is possible to further lower the center of gravity.

According to the present invention, since the length occupied by the fuel cylinder on the vehicle in the longitudinal direction can be shortened, it becomes possible to mount a large capacity fuel cylinder that has a large overall length without lengthening the wheelbase.

According to the present invention, it is possible to mount a large capacity fuel cylinder without impairing the operability of a shut-off valve of the fuel cylinder, and without lengthening the wheelbase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
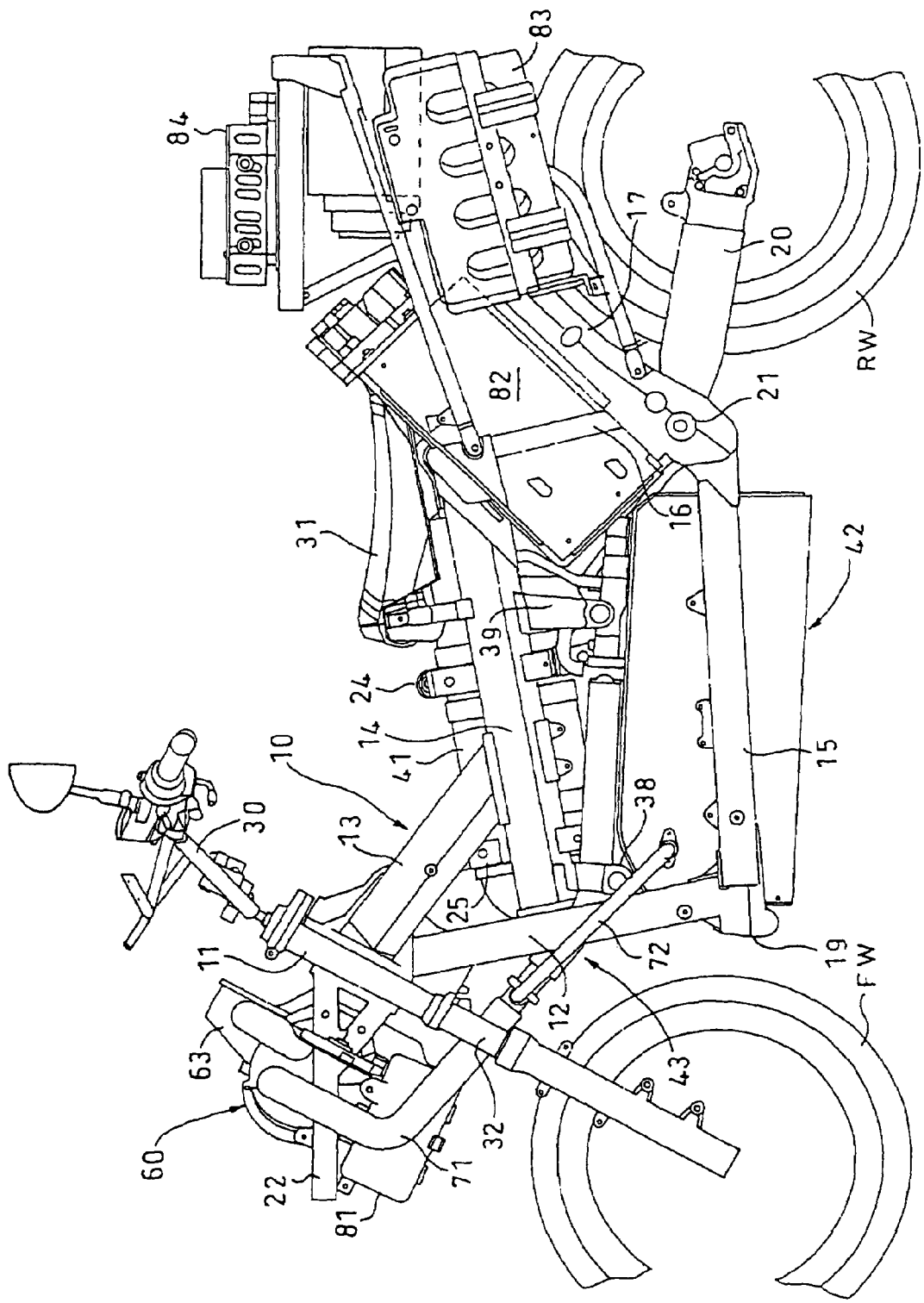
FIG. 1 is a partially broken side elevation showing the structure of main parts of a fuel cell motorcycle of the present invention.
Figure 2:
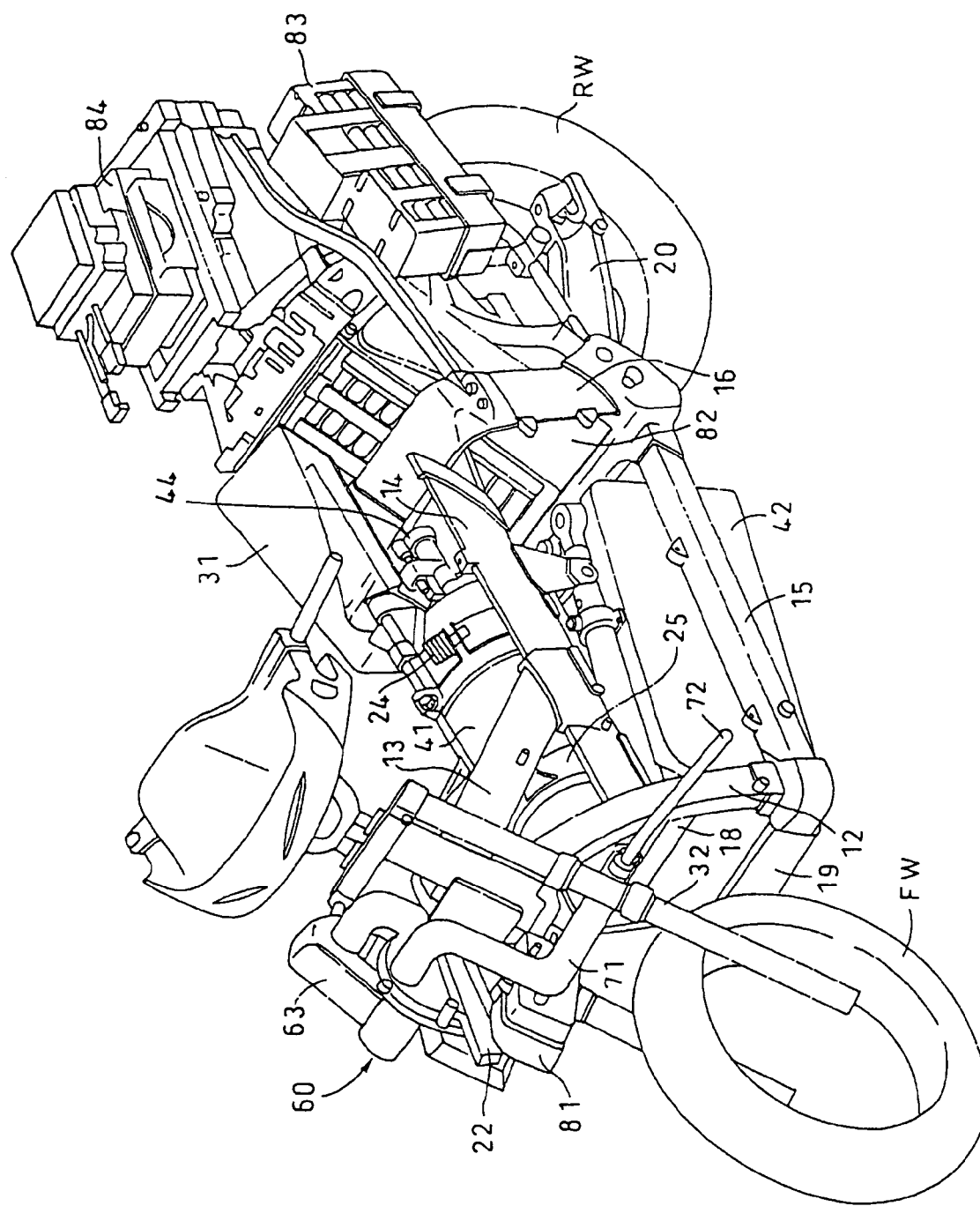
FIG. 2 is a partially broken perspective view showing the structure of main parts of a fuel cell motorcycle of the present invention.
Figure 3:
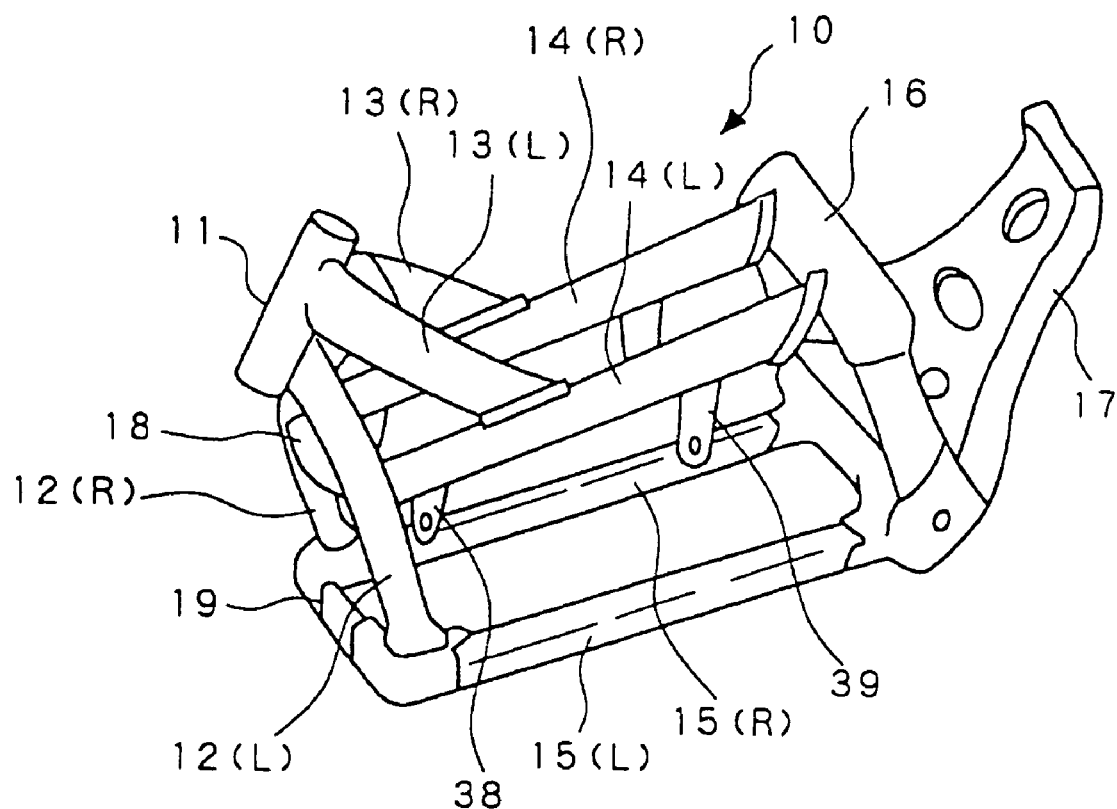
FIG. 3 is a drawing schematically showing the skeleton of a vehicle frame.

A detailed description will now be given of preferred embodiments of the present invention with reference to the drawings. FIG. 1 is a partially fractured cross-sectional drawing showing the main structure of a fuel cell motorcycle of the present invention wherein a vehicle frame 10 is made up of a head pipe 11 with a pair of left and right upper down frames 13 (L, R) extending diagonally downwardly with the head pipe 11 as a start point. A pair of left and right lower down frames 12 (L, R) are positioned further down relative to the upper down frames 13 that extend downwards with the head pipe 11 as a start point. A pair of left and right upper frames 14 (L, R) extending diagonally upwardly from substantially the center of the lower down frames 12 and are connected to the other end of the upper down frames 13 midway with a pair of left and right lower frames 15 (L, R) further down than the upper frames 14 and extending to the rear from a lower end of the lower down frames 12.

The vehicle frame 10 is also a substantially square annular structure, provided with an annular frame 16 supporting a rear end of the upper frame 14 and the lower frame 15 at the four corners of the square annular structure, a rear plate 17 extending diagonally upwards from the rear end of the lower frame 15, and an upper connecting frame 18 and a lower connecting frame 19 connected at a position where the upper frame 14 and the lower frame 15 connect.

A front fork 32 axially supports a front wheel FW and a steering handle 30 is connected to the front fork 32 and supported on the head pipe 11 in a manner capable of being steered. A pair of left and right swing frames 20 are swingably supported at a lower part of the rear plate 17 with a shaft 21 as a fulcrum. A rear wheel WR as a drive wheel is supported at a rear end of the swing frames 20.

A fuel cell system of the present invention includes a fuel cell box 42 storing a fuel cell stack 48, a fuel cylinder 41 storing fuel gas (hydrogen) for supply to the fuel cell stack inside the fuel cell box 42 and a piping system 43 for supplying scavenge gas taken in from the atmosphere and reactant gas and cooling gas to the inside of the fuel cell box 42. In addition, a plurality of secondary batteries 81, 93 and fuel cells 82 are fitted as an auxiliary power source.

The fuel cylinder 41 is supported by and between the left and right upper frames 14 and is mounted further forward relative to a seat 31 along the upper frames 14 and at an inclined attitude such that the shut-off valve 44 side faces to the rear and one end of the shut-off valve side is higher than the other end.

Figure 4:
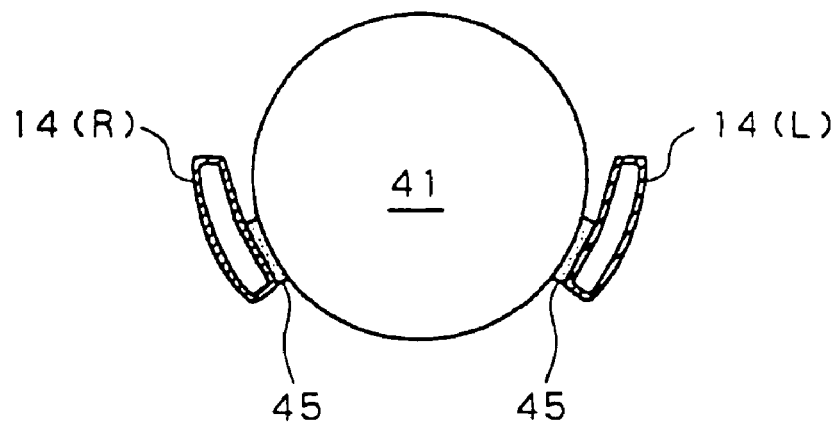
FIG. 4 is a front view showing the appearance of a fuel cylinder supported by upper frames.

FIG. 4 is a front view showing the appearance of the fuel cylinder 41 supported by the upper frames 14. The left and right upper frames 14 (L, R) have a narrower gap between the two going from bottom to top. Thus, it is possible to support the fuel cylinder 41 in a recumbent attitude. An impact-absorbing member 45 is fitted to a surface of the upper frames 14 contacting the fuel cylinder 41. As will be described in detail later, the fuel cylinder 41 is rigidly restrained in the upper frames 14 by a suitable restraint, such as binding bands 24, 25.

The fuel cell box 42 is positioned below the fuel cylinder 41 between the pair of left and right lower frames 15 and is fixed by being suspended from brackets 38, 39 provided at two places (a total of four places) on the left and right upper frames 14 (L, R), so as to overlap and run along a line connecting a rotational axis of the front wheel FW and the rotational axis of the rear wheel RW.

In this manner, with this embodiment the fuel cylinder 41 and the fuel cell box 42 are arranged so that the fuel cylinder 41 is positioned almost directly above the fuel cell stack, and the seat is positioned behind them, which means that drivability is improved by centralizing the mass. Also, since the fuel cylinder 41 and the fuel cell box 42 are arranged further forward relative to the seat position, load shared by the rear wheel which was excessive previously, is reduced, while load shared by the front wheel, which was slight previously, is increased. Thus, load sharing between the front and ear wheels is made suitable. Also, since the fuel cylinder 41 and the fuel cell stack are arranged close to each other it is possible to shorten the length of a fuel gas supply passage.

Secondary batteries 81, 83, as an auxiliary power source, and the fuel cell 82 are arranged in a dispersed manner at the front of the vehicle, below the seat 31 and at the rear of the vehicle, respectively. Also, a down converter 84 for converting the output voltage of the fuel cell system to a voltage for auxiliary devices (for example, 12V), and peripheral circuits for the down converter, are mounted to the rear of the vehicle. A blower module 60, for taking in external air at the front of the vehicle and strongly supplying the air to the fuel cell box 42 as scavenge gas, reactant gas or cooling gas, is mounted on the front frame 22 extending forwards from the head pipe 11.

Figure 15:
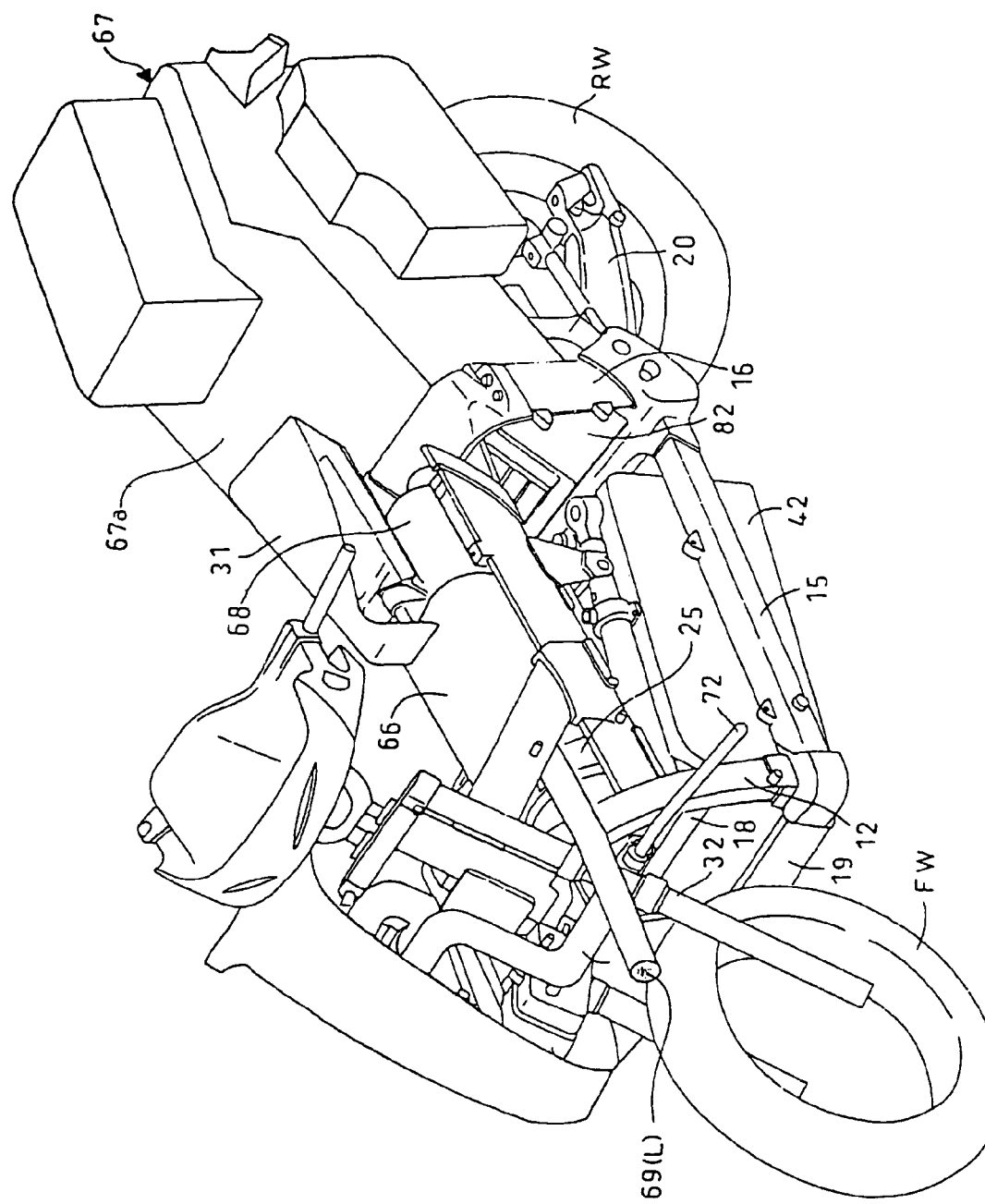
FIG. 15 is a partial cut-away perspective view showing parts of the present invention.

FIG. 15 is a partially cut-away perspective view of a state where a cooling mechanism for cooling the fuel cylinder 41 and the electrical circuit 83 with external air is equipped. The same reference numerals represent the same parts.

The fuel cylinder cover 66 covers the fuel cylinder 41 so as to form a ventilation duct connecting from the front of the vehicle to the rear between the outer surface of the fuel cylinder 41 and the cover 66 to ensure a specific gap between the outer surface and the cover. The electrical circuit cover 67 covers the electrical circuit 84, secondary cells 82 and the battery 83 with a front surface 67a being inclined upwards to the rear. The exhaust duct 68 directs external air discharged from the ventilation duct formed between the fuel cylinder 41 and the fuel cylinder cover 66 towards a downstream side of the inclined surface 67a of the electrical circuit cover 67. A pair of left and right intake ducts (L,R) have intake ports oriented to the front of the vehicle with exhaust ports connected to the ventilation ducts.

With this type of structure, after the fuel cylinder 41 has been cooled by supplying external air that has been taken in from the intake ducts 69 to the ventilation duct formed between the fuel cylinder 41 and the fuel cylinder cover 66, the electrical circuit 84 inside the electrical circuit cover is cooled by the external air flowing along the inclined surface of the electrical circuit cover 67. As a result, it is possible to efficiently cool both the fuel cylinder 41 and the electrical circuit 84 without providing cooling means such as a blowing fan or a blower.

According to the above-described embodiment, since the electrical circuit 84 is not directly bombarded with external air that has cooled the fuel cylinder 41, the electrical circuit 84 is not adversely affected even if fuel gas from the fuel cylinder 41 leaks out and mixes with the external air. In other words, according to this embodiment, since it is possible to also cool up to the electrical circuit 84 using external air that has cooled the fuel cylinder 41, there is no need to separately take in external air for cooling the electrical circuit 84 and external air for cooling the fuel cylinder 41.

Figure 5:
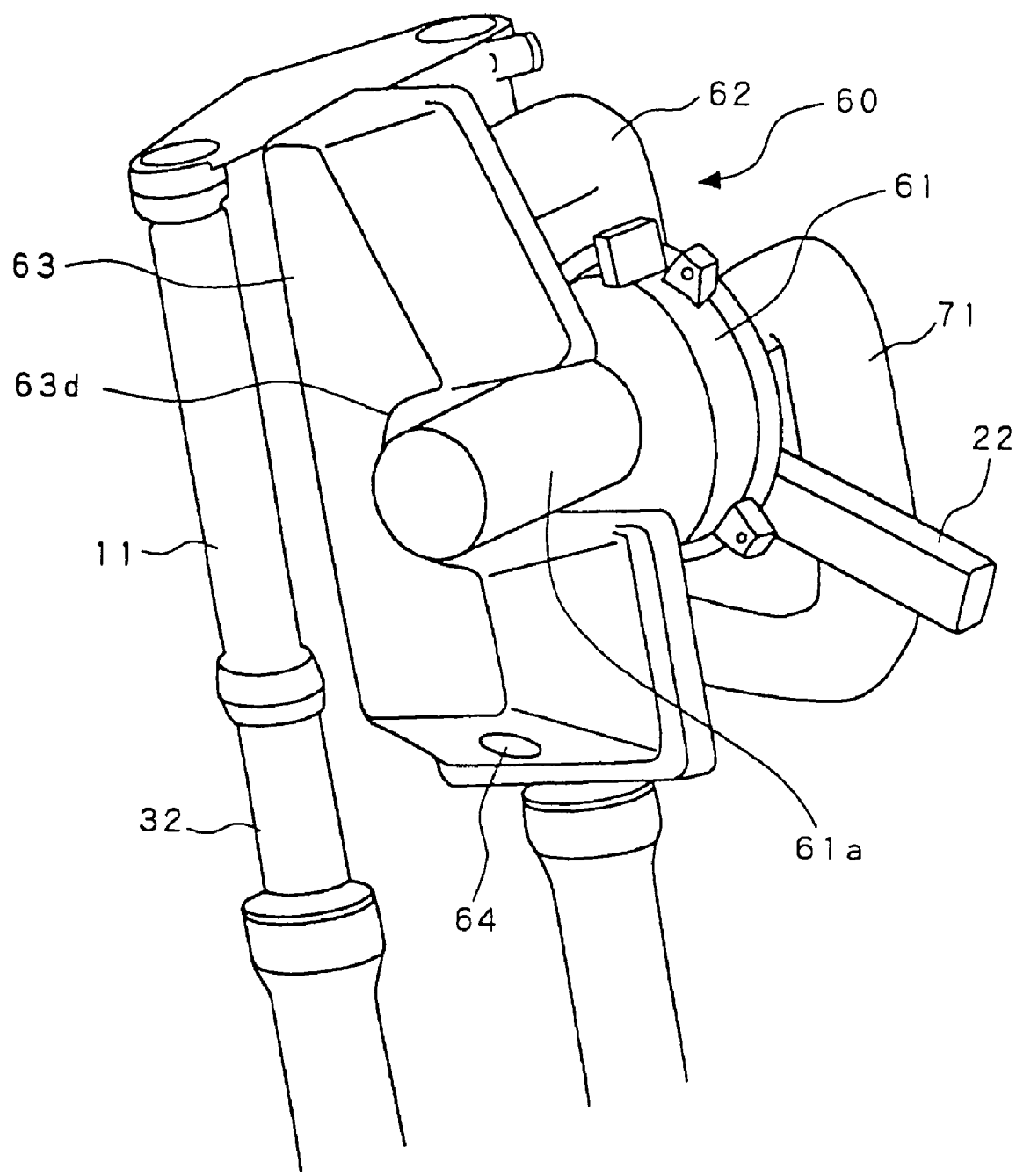
FIG. 5 is a drawing of a blower module looking diagonally from the front right of the vehicle.
Figure 6:
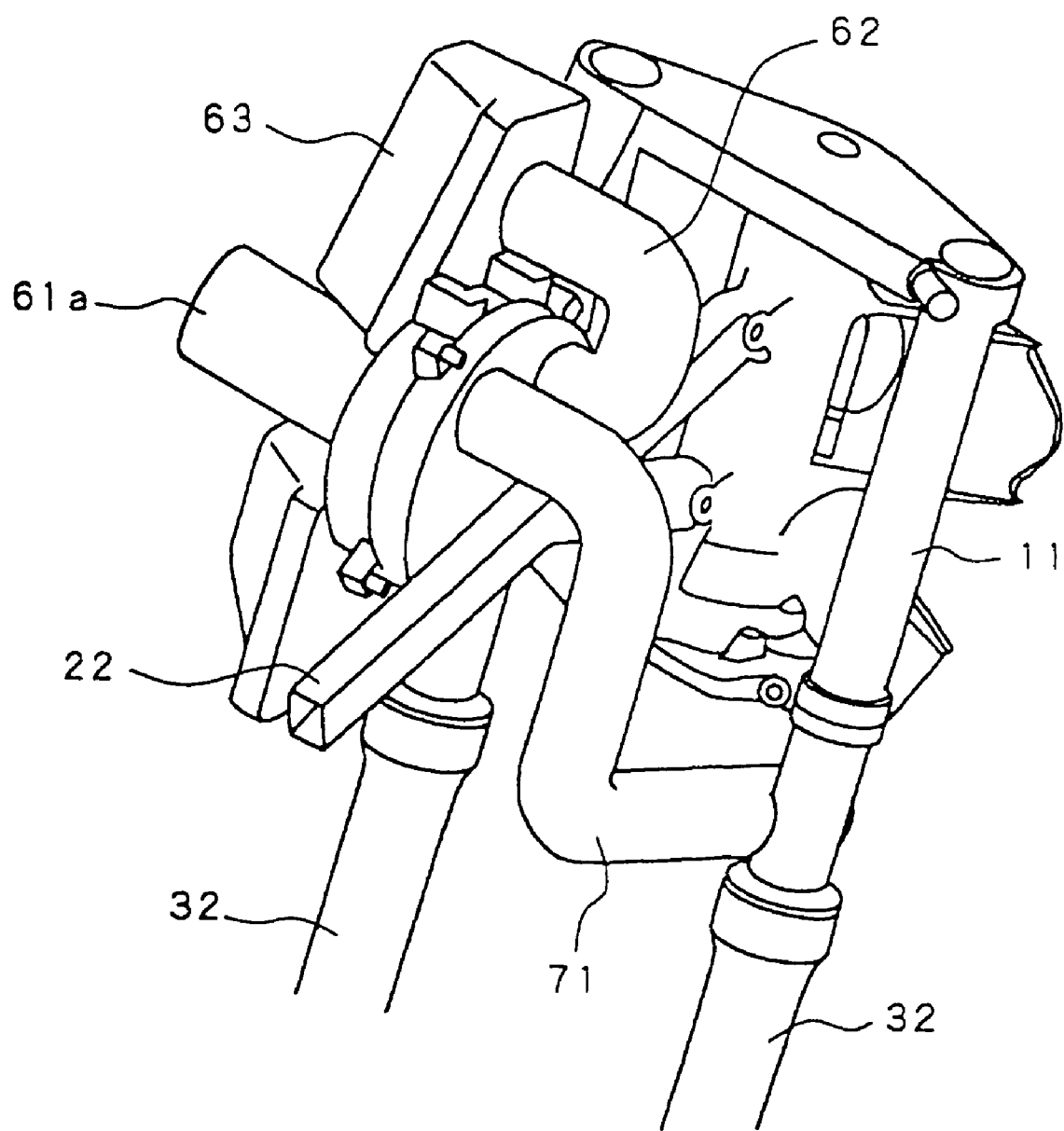
FIG. 6 is a drawing of the blower module looking diagonally from the front left of the vehicle.

FIG. 5 is a drawing of the blower module 60 looking diagonally from the front right of the vehicle, while FIG. 6 is a drawing of the blower module 60 looking diagonally from the front left of the vehicle. The reference numbers that are the same in the two drawings represent the same parts.

Figure 7:
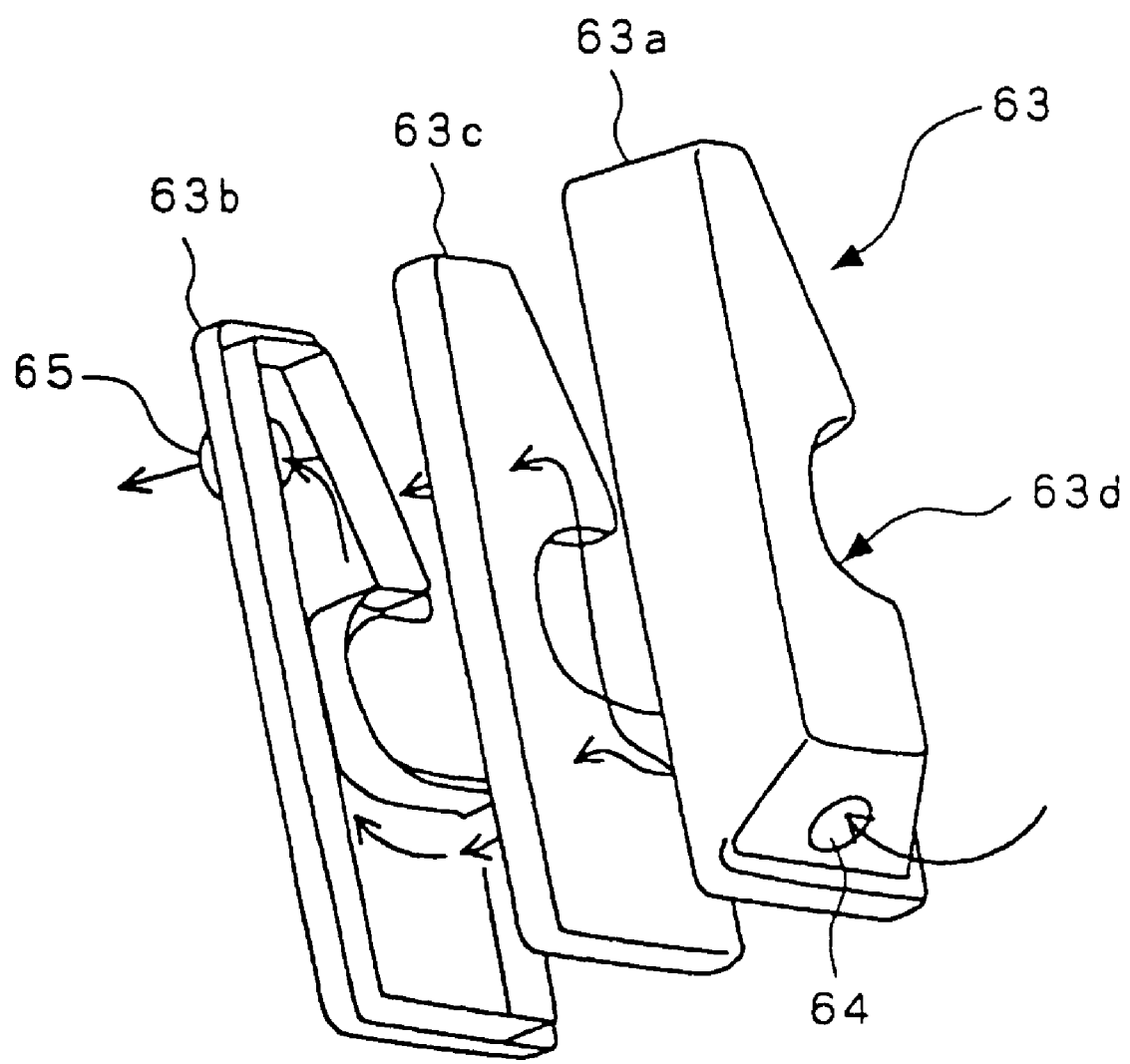
FIG. 7 is a drawing showing the structure of an air cleaner.

The blower module 60 is mainly comprised of a blower body 61 housing a blower motor and a blower fan (neither of which are shown in the drawing), an air cleaner 63, and an intake pipe 62 connecting the air cleaner 63 and the blower body 61. As shown in FIG. 7, the air cleaner 63 has an air filter 63c housed inside a case made up of a right case 63a and a left case 63b. An intake port 64 for taking in external air is formed in a lower end side of the right case 63a, while an exhaust port 65 is formed in a main surface of the left case 63b. The intake pipe 62 is connected to the exhaust port 65.

As shown in FIG. 5, the air cleaner 63 is attached to the vehicle body at an attitude with the intake port 64 oriented diagonally downwards to the left of the vehicle body. A cut-out 63d is formed in the side surface of the air cleaner 63, and a blower motor section 61a of the blower body 61 is stored in the cut-out 63d.

If the blower body 61 is activated, the intake pipe 62 is put at a negative pressure, and external air is sucked from the intake port 64 of the air cleaner 63.

This external air is filtered by the air filter 63c inside the air cleaner 63, then taken into the inside of the intake pipe 62 from the exhaust port 65 and finally supplied to a blowing passage 71 by means of the blower body 61.

In this way, with this embodiment, since external air is compressed and supplied to the fuel cell box 42 using the blower module 60, it is possible to improve the power generation efficiency of the fuel cells. Also, with this embodiment, because the air cleaner 63 is arranged further upstream than the blower body 61, it is possible to reduce intake noise generated by the blower body 61 at the air cleaner 63. Further, since in this embodiment the intake port 64 of the air cleaner 63 is oriented to the bottom of the vehicle body, it is possible to prevent rain water from penetrating into the intake port 64.

Figure 8:
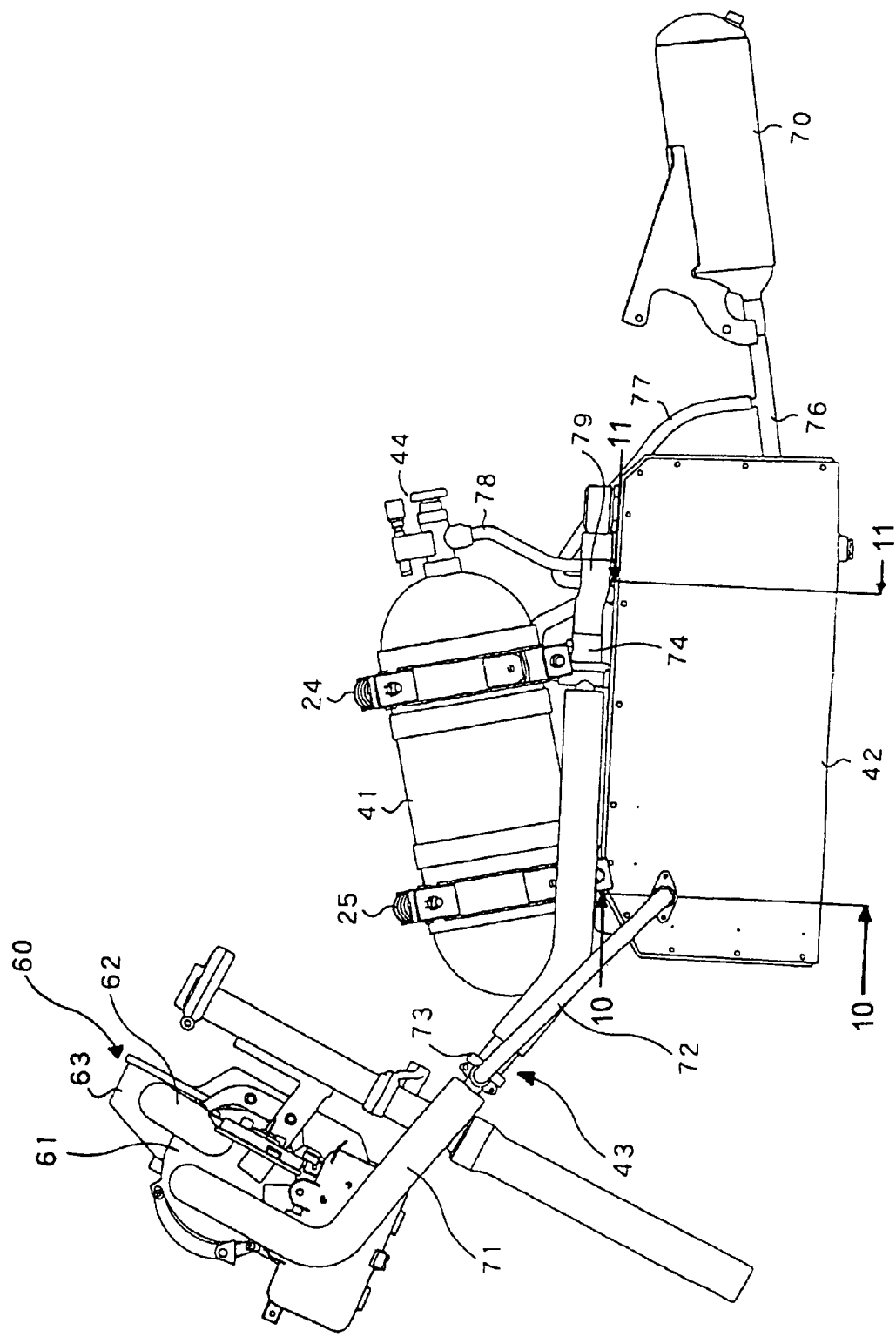
FIG. 8 is a side elevation showing the structure of a piping system for connecting to a subsequent stage to the blower module.
Figure 9:
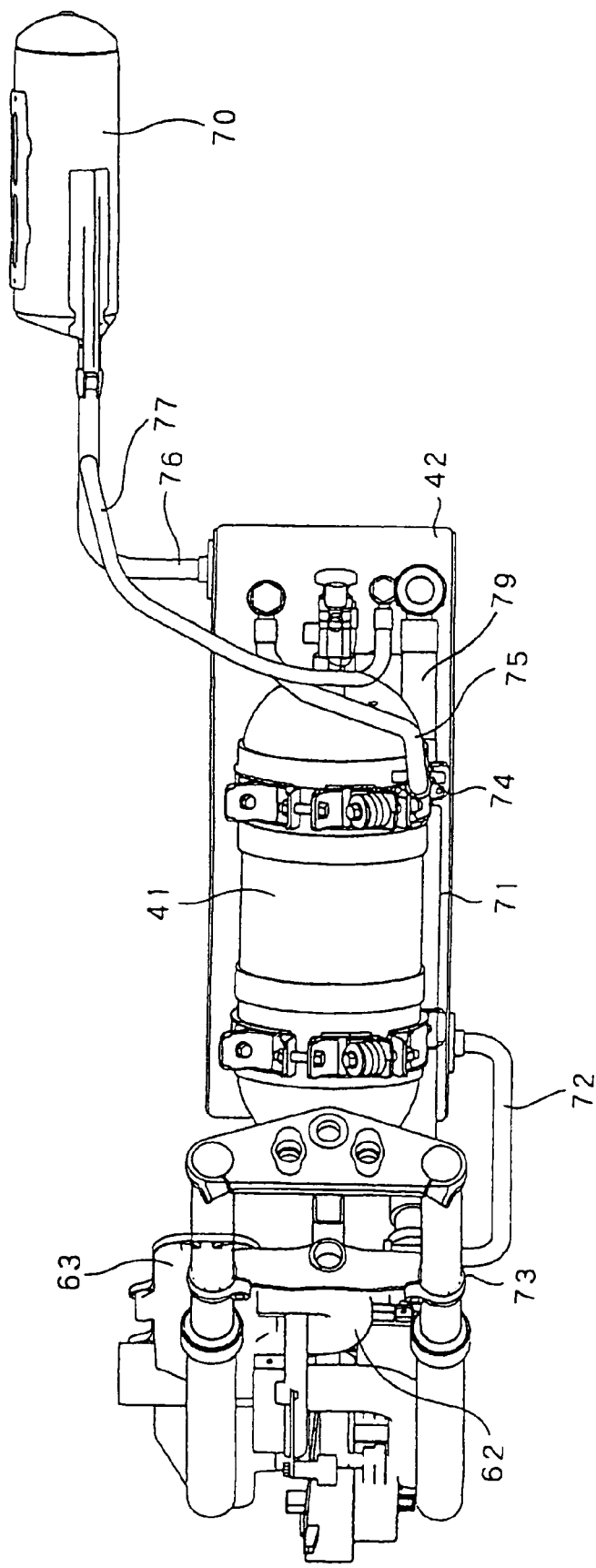
FIG. 9 is a front elevation showing the structure of a piping system for connecting to a subsequent stage to the blower module.

FIG. 8 is a side elevation view and FIG. 9 is a front elevation view showing the structure of a piping system 43 connected to a subsequent stage to the blower module 60. The reference numerals that are the same in these two drawing represent the same parts.

Two bypass valves 73, 74 are provided in the blowing passage 71. A scavenge gas supply passage 72 for introducing external air into the inside of the fuel cell box 42 as scavenge gas is branched from the upstream bypass valve 73. The upstream bypass valve 73 is an electromagnetic valve. External air is only supplied to the scavenge gas supply passage 72 when this valve is open. The downstream bypass valve 74 contains an electromagnetic three-way valve and the blowing passage 71 branches into a reactant gas supply passage 75 and a cooling gas supply passage 79 at the downstream bypass valve 74. Each of the upstream and downstream bypass valves 73, 74 are subjected to opening and closing control by the same ECU that controls the vehicle.

The reactant gas supply passage 75 supplies external that is supplied from the blowing passage 71 to the fuel cell stack 48 as reactant gas (oxygen). The cooling gas supply passage 79 supplies external air supplied from the blowing passage 71 to the fuel cell stack 48 as cooling gas. The reactant gas supply passage 75 and the cooling gas supply passage 79 are divided to the left side (cooling gas supply passage 79) and the right side (reactant gas supply passage 75) of the vehicle body, so that internal gas (air) is cooled by being blown by wind during operation.

With this embodiment, if an ignition switched is turned on, the blower module 60 is energized to commence suction of external air and pumping of the sucked in air. Thus, the external air passes from the upstream bypass valve 73 of the blowing passage 71 through the scavenge gas supply passage 72 and is guided to the inside of the fuel cell box 42 as scavenge air. At the same time, since the downstream bypass valve 74 is open with this embodiment, the external air is supplied through the reactant gas supply passage 75 to the fuel cell stack 48, and also supplied through the cooling gas supply passage 79 to the fuel cell stack 48.

On the other hand, with this embodiment, the temperature Tbatt of the fuel cell stack 48 is routinely measured by a temperature sensor, not shown, and if the ignition switch is turned off, the stack temperature Tbatt is compared with a specified reference temperature Tref1. Control is carried out so that if Tbatt<Tref 1, the downstream bypass valve 74 does not supply eternal air that has been supplied from the blowing passage 71 to either the reactant gas supply passage 75 side or to the cooling gas supply passage 79, while if Tbatt≧Tref 2 supply to the reactant gas supply passage 75 side is stopped and supply only continues to the cooling gas supply passage 79.

A scavenge air outlet passage 76 for discharging the scavenge gas and a hydrogen outlet passage 77 for discharging purged fuel gas (hydrogen) are also connected to the fuel cell box 42. The other end of each passage is connected to a silencer 70. The scavenge gas and purged hydrogen gas are mixed in the silencer 70 and discharged to the outside. In this way, with this embodiment scavenge gas and purged hydrogen gas are discharged through the silencer 70, which means that it is possible to reduce exhaust noise.

The fuel cylinder 41 and the fuel cell box 42 are connected by a fuel gas supply passage 78, and fuel gas (hydrogen) to the fuel cell stack 48 inside the fuel cell box 42 is supplied from the fuel cylinder 41 through this fuel gas supply passage 78. With this embodiment, the voltage of each cell constituting the fuel cell stack is monitored, and if even one of them drops below a reference voltage hydrogen purging is carried out.

Figure 10:
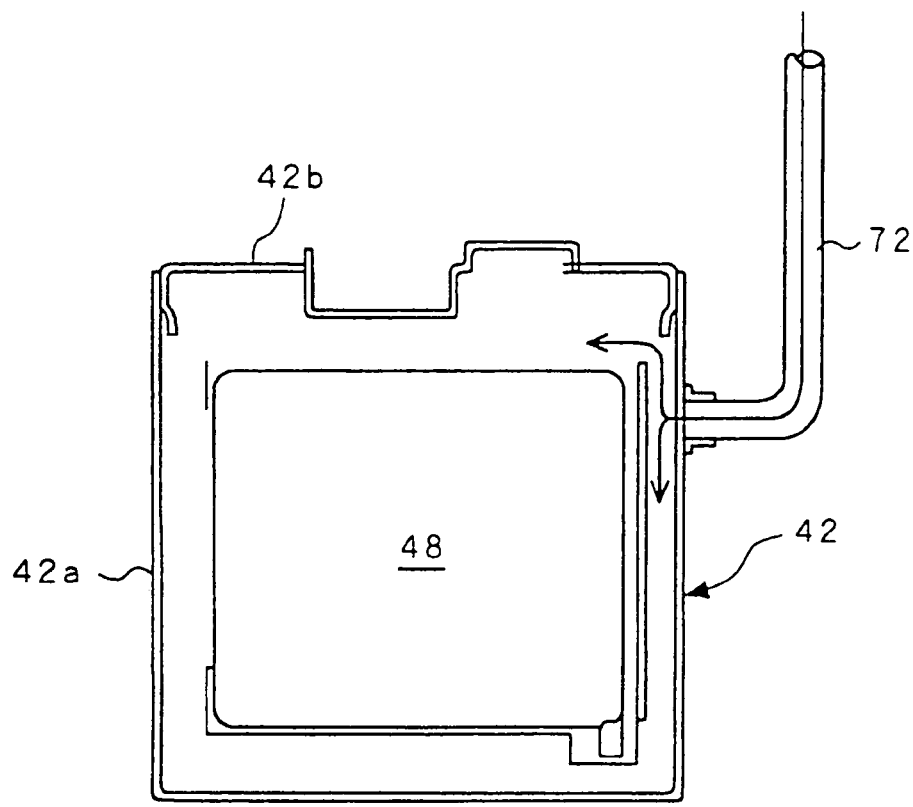
FIG. 10 is a cross section along line 10—10 of the fuel cell box shown in FIG. 8.
Figure 11:
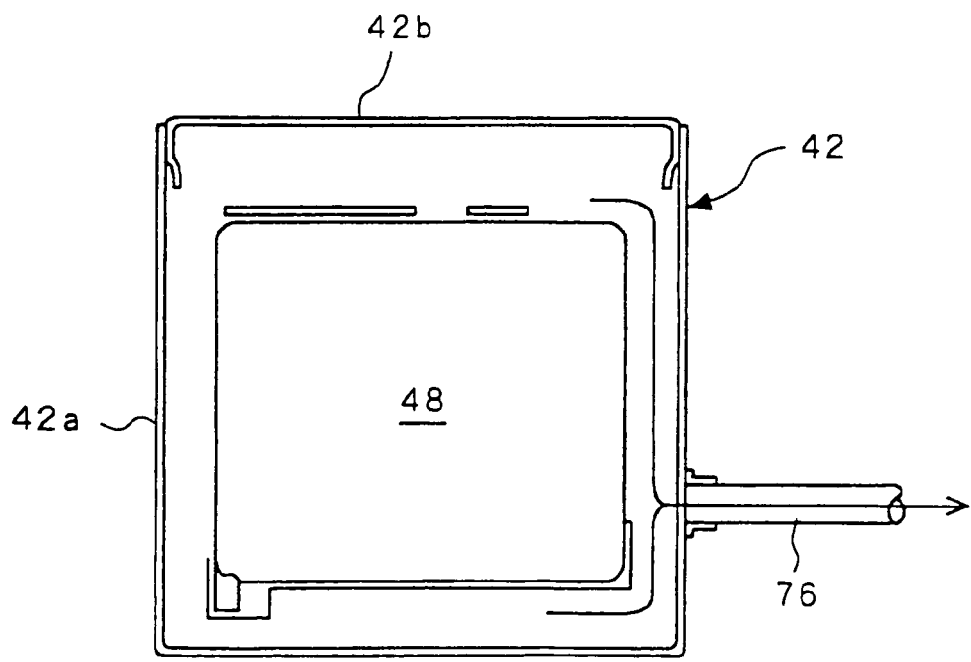
FIG. 11 is a cross section along line 11—11 of the fuel cell box shown in FIG. 8.

FIG. 10 and FIG. 11 are a cross section along line 10—10 and line 11—11 of the fuel cell box 42 illustrated in FIG. 8. The same reference numerals in each drawing represent the same parts.

Inside the fuel cell box 42, the substantially cube-shaped fuel cell stack 48 is supported so that a scavenge air space is ensured between the 6 surfaces of the fuel cell stack 48 and the box cases 42a, 42b. External air introduced from the scavenge gas supply passage 72 to the inside of the fuel cell box 42 as scavenge gas turns gas retained in the space between the box cases 42a and 42b and the fuel cell stack 48 into scavenge gas and discharges it from the scavenge air outlet passage 76.

Figure 12:
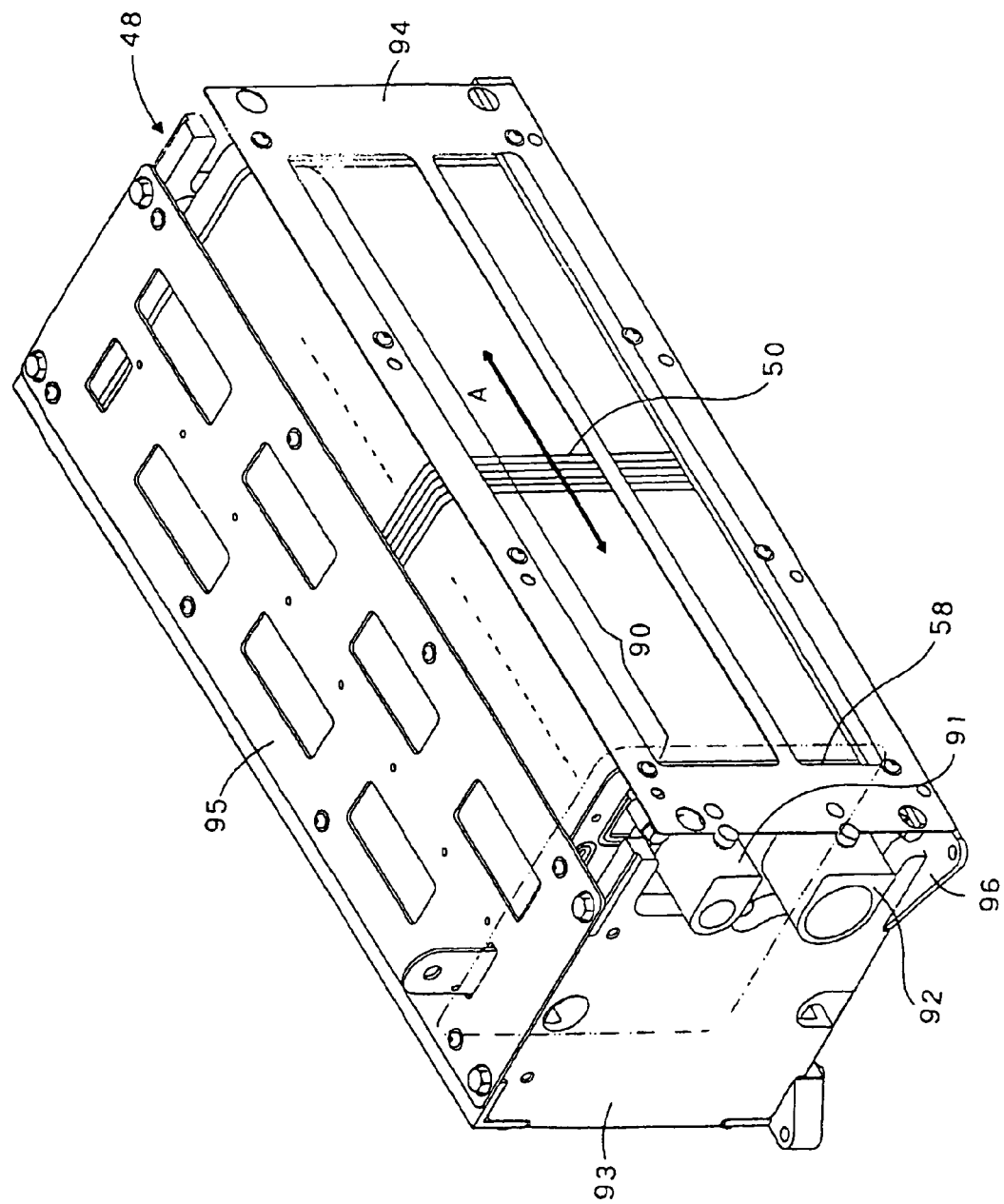
FIG. 12 is a perspective view of a fuel cell stack.
Figure 13:
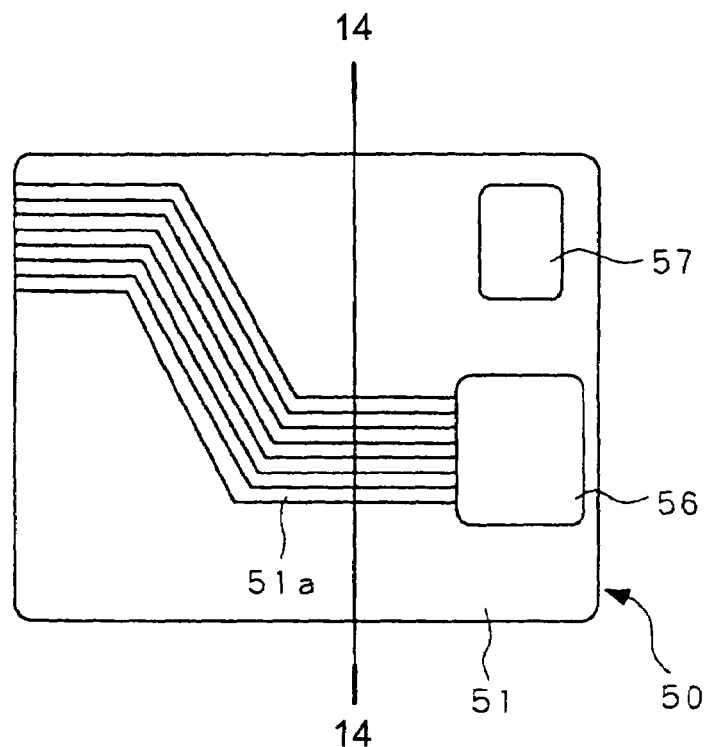
FIG. 13 is a plan view of a battery cell.
Figure 14:
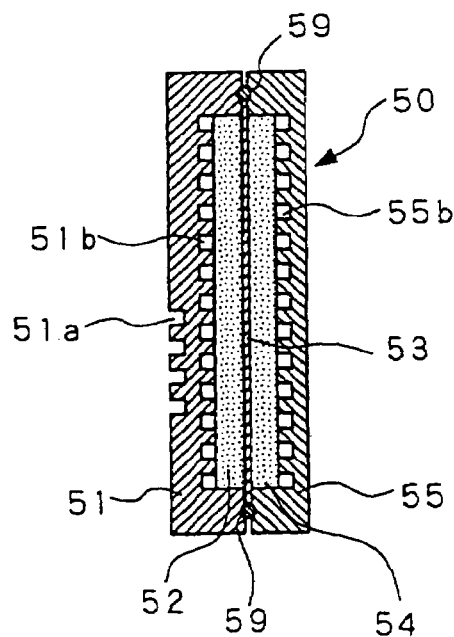
FIG. 14 is a cross sectional drawing along line 14—14 in FIG. 13.

FIG. 12 is a perspective view of the fuel cell stack 48. A laminated body 90, which is a main part of the fuel cell stack 48, is constructed of a plurality of cells 50 laminated in the direction of arrow A. Power collection electrodes 58 are arranged on either side. FIG. 13 is a plan view of a cell. FIG. 14 is a cross section along line 14—14 in FIG. 13.

As shown in FIG. 14, a cell 50 is constructed by overlapping a negative electrode side separator 51, a negative electrode 52, a fuel cell ion exchange membrane 53, a positive electrode 54 and a positive electrode side separator 55. As shown in FIG. 13, the cell 50 has a cooling gas manifold 56 and a reactant gas manifold 57 formed for passing these components through. The negative electrode 52 and the positive electrode 54 are formed from a catalyst bed and a porous layer and have a gas diffusion function.

A cooling gas flow groove 51a is formed in the negative electrode side separator 51, in an outer main surface, and a hydrogen flow groove 51b is formed in a surface of the negative electrode side separator 51 that is opposite the fuel cell ion exchange membrane 53, at an inner main surface. An air flow passage 55b is formed in a surface of the negative electrode 52 that is opposite to the fuel cell ion exchange membrane 53. The cooling gas flow groove 51a links to the cooling gas manifold 56 and the air flow passage 55b links to the reactant gas manifold 57. Although omitted from the drawings, fuel gas supplied from the connecting wall section 41 through the fuel gas supply passage 78 is supplied to the hydrogen flow groove 51b formed in the negative electrode side separator 51.

Returning to FIG. 12, the laminated body 90 is covered by endplates 93 arranged on both sides in a laminate direction, side plates 94 are arranged on the sides, a top plate 95 is arranged at the top, and a bottom plate is arranged at the bottom. A pressure increase is maintained so that a constant elastic force acts in the laminate direction.

A reactant gas introduction port 91 and a cooling gas introduction port 92 are provided in endplate 93 side end sections. The reactant gas introduction port 91 links to the reactant gas manifold 57 and external air from the reactant gas supply passage 75 is introduced as reactant gas for power generation. This reactant gas is supplied to the air flow passage 55b through the reactant gas manifold 57. The cooling gas introduction port 92 is linked to the cooling gas manifold 56 and cooling gas is introduced from an end section of the blowing passage 71. This cooling gas is supplied through the cooling gas manifold 56 to the cooling gas flow groove 51a.

With the above described embodiment, a description has been given where the present invention is applied to a two-wheeled vehicle. However, the present invention is not thus limited and can also be similarly applied to a three wheeled vehicle of a four wheeled vehicle.

According to the present invention, the following effects are achieved. Since the heavy fuel cylinder and fuel cell stack are arranged concentrated at a single place the drivability is improved by centralizing mass. Also, since the fuel cylinder and the fuel cell stack are arranged further forward than the seating position, it is possible to arrange the fuel cylinder and the fuel cell stack close to each other, with the result that it is possible to shorten the length of th fuel gas supply passage.

According to the present invention, since the fuel stack is arranged at a position lower than the step floor, it is possible to further lower the center of gravity.

According to the present invention, since the length occupied by the fuel cylinder on the vehicle in the longitudinal direction can be shortened, it becomes possible to mount a large capacity fuel cylinder that has a large overall length without lengthening the wheel base.

According to the present invention, it is possible to mount a large capacity fuel cylinder without impairing the operability of a shut-off valve of the fuel cylinder and without lengthening the wheel base.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel cell vehicle, provided with a fuel cylinder and a fuel cell stack, and traveling under electrical power obtained through the supply of fuel gas and reactant gas to a fuel cell stack, comprising:
   support means for supporting both the fuel cylinder and the fuel cell stack so that the fuel cylinder is positioned almost directly above the fuel cell stack;
   a seating section provided further to the rear of the vehicle than the position where the fuel cylinder and the fuel cell stack are supported; and
   a shut-off valve;
   wherein the fuel cylinder is supported in a longitudinal direction of the vehicle and at an inclined attitude of a specified angle so that a rear end of the fuel cylinder is higher than a front end of the fuel cylinder, the shut of valve being disposed at the rear end of the fuel cylinder.

2. The fuel cell vehicle according to claim 1, wherein the support means is a vehicle frame and the fuel cell stack is arranged at the lowest position on the vehicle frame along a lower frame provided to extend in a longitudinal direction of the vehicle.

3. The fuel cell vehicle according to claim 2, wherein the fuel cell stack is arranged along a straight line connecting a rotational axis of a front wheel and a rotational axis of a rear wheel and overlapping this line.

4. The fuel cell vehicle according to claim 1, wherein the fuel cylinder is restrained on a pair of upper frames by at least one binding band.

5. The fuel cell vehicle according to claim 1, wherein the fuel cylinder is supported on impact-absorbing members that are fitted to surfaces of a pair the upper frames.

6. The fuel cell vehicle according to claim 1, and when the vehicle is viewed from a vehicle side, upper and lower portions of the fuel cylinder are visible above and below one of a pair of upper frames.

7. A fuel cell vehicle, provided with a fuel cylinder and a fuel cell stack, and traveling under electrical power obtained through the supply of fuel gas and reactant gas to a fuel cell stack, comprising:
   a head pipe;
   an upper frame extending rearwardly from the head pipe;
   a lower frame extending rearwardly from the head pipe, said upper and lower frames supporting both the fuel cylinder and the fuel cell stack wherein the fuel cylinder is positioned almost directly above the fuel cell stack; and a seat provided to the rear of the vehicle relative to the supporting position of the fuel cylinder and the fuel cell stack; and a shut-off valve;

wherein the fuel cylinder is supported in a longitudinal direction of the vehicle and at an inclined attitude of a specified angle so that a rear end of the fuel cylinder is higher than a front end of the fuel cylinder, the shut of valve being disposed at the rear end of the fuel cylinder.

8. The fuel cell vehicle according to claim 7, wherein the fuel cell stack is arranged at the lowest position on the lower frame provided to extend in a longitudinal direction of the vehicle.

9. The fuel cell vehicle according to claim 8, wherein the fuel cell stack is arranged along a straight line connecting a rotational axis of a front wheel and a rotational axis of a rear wheel and overlapping this line.

10. The fuel cell vehicle according to claim 7, wherein the fuel cylinder is restrained on the upper frame by at least one binding band.

11. The fuel cell vehicle according to claim 7, wherein the fuel cylinder is supported on an impact-absorbing member that is fitted to a surface of the upper frame.

12. The fuel cell vehicle according to claim 7, and when the vehicle is viewed from a vehicle side, upper and lower portions of the fuel cylinder are visible above and below the upper frame.

13. A fuel cell vehicle, provided with a fuel cylinder and a fuel cell stack, and traveling under electrical power obtained through the supply of fuel gas and reactant gas to a fuel cell stack, comprising:

a head pipe;

left and right down frames operatively connected to the head pipe;

left and right upper frame operatively connected and extending rearwardly from respective left and right down frames;

left and right lower frame operatively connected and extending rearwardly from respective left and right down frames, said left and right upper frames and said left and right lower frames supporting both the fuel cylinder and the fuel cell stack wherein the fuel cylinder is positioned almost directly above the fuel cell stack; and a seat provided to the rear of the vehicle relative to the supporting position of the fuel cylinder and the fuel cell stack.

14. The fuel cell vehicle according to claim 13, wherein the fuel cell stack is arranged at the lowest position on the left and right lower frames provided to extend in a longitudinal direction of the vehicle.

15. The fuel cell vehicle according to claim 14, wherein the fuel cell stack is arranged along a straight line connecting a rotational axis of a front wheel and a rotational axis of a rear wheel and overlapping this line.

16. The fuel cell vehicle according to claim 14, wherein the fuel cylinder is supported in a longitudinal direction of the vehicle and at an inclined attitude of a specified angle.

17. The fuel cell vehicle according to claim 13, wherein the fuel cylinder is supported in a longitudinal direction of the vehicle and at an inclined attitude of a specified angle.

18. The fuel cell vehicle according to claim 17, wherein the fuel cylinder is supported at an inclined attitude with a shut-off valve end of the fuel cylinder to the rear with the rear end being higher than the front end.

* * * * *